US006796044B2

(12) United States Patent
Prieschl

(10) Patent No.: US 6,796,044 B2
(45) Date of Patent: Sep. 28, 2004

(54) NAVIGATION DEVICE

(76) Inventor: Marco Prieschl, 299 7th Ave. #4, Brooklyn, NY (US) 11215

( * ) Notice: Subject to any disclaimer, the term of this patent is extended or adjusted under 35 U.S.C. 154(b) by 0 days.

(21) Appl. No.: 10/292,056

(22) Filed: Nov. 12, 2002

(65) Prior Publication Data

US 2003/0115763 A1 Jun. 26, 2003

Related U.S. Application Data

(63) Continuation-in-part of application No. 09/930,397, filed on Aug. 15, 2001, now abandoned.

(51) Int. Cl.[7] .......................... G01C 17/04; G01C 17/20
(52) U.S. Cl. .................... 33/355 R; 33/679.1
(58) Field of Search ..................... 33/344, 345, 346, 33/352, 354, 355 R, 679.1, 364

(56) References Cited

U.S. PATENT DOCUMENTS

| | | | | |
|---|---|---|---|---|
| 2,136,970 A | * | 11/1938 | Ekeberg | 33/364 |
| 2,336,789 A | * | 12/1943 | Jonsson | 33/364 |
| 3,023,512 A | * | 3/1962 | Morris et al. | 33/352 |
| 3,544,253 A | * | 12/1970 | Bloom et al. | 33/354 |
| 3,983,630 A | * | 10/1976 | Hamm et al. | 33/1 SD |
| 4,236,316 A | * | 12/1980 | Suzuki | 33/364 |
| 4,404,752 A | * | 9/1983 | Hanna | 33/355 R |
| 4,438,568 A | * | 3/1984 | Kramer et al. | 33/355 R |
| 5,697,162 A | * | 12/1997 | Bornand et al. | 33/352 |
| 6,357,128 B1 | * | 3/2002 | Iden | 33/352 |

* cited by examiner

Primary Examiner—G. Bradley Bennett
(74) Attorney, Agent, or Firm—Cohen, Pontani, Lieberman & Pavane

(57) ABSTRACT

The navigation device includes a compass module including a base, a permanent dipolar magnet mounted for rotation relative to the base so that the magnet tends to align with the earth's magnetic north, a disc having a display fixed with respect to the magnet, and a transparent cover fixed to the base and arranged over the display surface. The display surface has map indicia for a pre-determined geographic area, map indicia being oriented to define a direction of magnetic north with respect to the map indicia, the indicia being aligned with respect to magnet so that the direction of magnetic north with respect to the map indicia coincides with earth's magnetic north when the magnet is aligned with earth's magnetic north. The compass module is fixed in a housing having a slot from which a folded map of the pre-determined area can be withdrawn, one end of the map remaining fixed to the housing. When the user rotates the map so that indicia on the disc are parallel to corresponding indicia on the map, the user will be correctly oriented to features on the map.

22 Claims, 9 Drawing Sheets

NAVIGATION DEVICE

RELATED APPLICATIONS

This application is a continuation-in-part of U.S. application Ser. No. 09/930,397 filed Aug. 15, 2001, now abandoned. This parent application is incorporated herein by reference.

BACKGROUND OF THE INVENTION

1. Field of the Invention

The present invention relates to a navigation device which is adapted for use in a pre-determined geographic area. More particularly, the invention relates to a navigation device using a magnet which is free to rotate so that it can align with the earth's magnetic field.

2. Description of the Related Art

A conventional compass usually includes a magnetic needle which is mounted for rotation over a face indicating the principal directions of north, south, east and west at ninety degree intervals, and may include gradations therebetween for precise determination of a traveler's direction or bearing. The needle is typically journaled on a pin fixed in a housing having a transparent cover for viewing the position of the needle relative to the compass face, whereby the user can determine which way is north. When a user wishes to orient himself with respect to features on a map, the map must be oriented with respect to the compass, so that the north point on the map corresponds to the direction of north as indicated by the compass.

While the foregoing procedure might be considered great fin by someone on an orienteering expedition in a remote area, it is somewhat burdensome for a tourist in an urban area, who typically is not armed with a compass and may not know how to use one anyhow. Emerging on the street above a subway station in a strange city with only a map, he or she might have no clue how to orient the map to find a destination. Furthermore, he or she typically does not care which way is north; he or she only wants to know which way to head to reach the destination. He or she therefore needs a simple navigation device for determining the right direction. Such a device would also be useful for someone already familiar with a city, since emerging from an unfamiliar subway station can be disorienting.

SUMMARY OF THE INVENTION

According to the invention, a magnet is mounted for rotation with respect to a base so that the magnet tends to align with the earth's magnet north, as in a conventional compass. However the magnet is provided with a display surface, which is preferably on a disc fixed to the magnet and freely rotatable therewith, the display surface having map indicia for a predetermined geographic area. The map indicia are oriented to define a direction of magnetic north with respect to the map indicia, as are any at least two points on a map. The map indicia on the display surface are also aligned with respect to the magnet so that the direction of magnetic north with respect to the map indicia coincides with the earth's magnetic north when the magnet is aligned with the earth's magnetic north. However the direction of magnetic north need not be indicated on the disc bearing the map indicia.

The base, the magnet, the disc, and a transparent cover are preferably assembled as a compass module, which in turn can be fixed to a housing having a slot for storing a map. According to a preferred embodiment, the map may be partially withdrawn from the slot and unfolded for use with the compass, while remaining fixed to the housing. The housing can be rotated until the map indicia on the disc have respective orientations which are parallel to the corresponding indicia on the map. This is done in the same fashion as rotating a compass housing so that the north point on the face is aligned with the north end of the needle. The difference is, that no additional step of aligning with a map is necessary; this is accomplished in a single step by rotating the housing to which the map is fixed.

The compass module may be designed according to one of several embodiments including a first embodiment using an elongate neodymium or samarium cobalt permanent magnet and a ferrofluid. A ferrofluid is a fluid that can be manipulated by a magnetic field. The ferrofluid used in the compass module is a stable, colloidal suspension of nano-sized particles in a liquid carrier, the particles being coated with a surfactant to prevent agglomeration. In the presence of a magnetic field, the magnetic moments of the particles align themselves with the field lines, allowing the fluid to behave as a homogenous liquid. The magnetic field also increases the density of the fluid. When applied to the magnet, the fluid forms beads at opposite ends of the magnet, which beads support the magnet as a low friction bearing and also act as a damper to minimize oscillations.

According to a second embodiment the magnet is held in a carrier fixed to the disc by means of a bracket extending through an aperture in the disc and retained by the magnet itself. The bracket has a recess which is centered on a protrusion on the base. The recess is preferably a conical recess and the protrusion is preferably a cone which is self-centering in the recess.

The map indicia selected for representation on the disc will generally be well known indicia for the pre-determined geographic area for which the device is designed. In Manhattan, for example, the disc may be labeled with quadrants representing uptown, downtown, the east side, and the west side. But note that the orientation of these indicia with respect to the magnet does not correspond to north, south, east, and west when the magnet is aligned with magnetic north, because the direction of Uptown is 30 degrees toward the northeast. Likewise the Westside is angularly displaced counterclockwise by thirty degrees from west. The indicia chosen need not correspond to sections of the city but may be roads, a river, or landmarks. The only important thing is that someone with only limited familiarity with the area will recognize the indicia so that he can orient himself in the geographic area. By aligning a map with the indicia on the disc, he can also orient himself to features shown in greater detail on the map.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
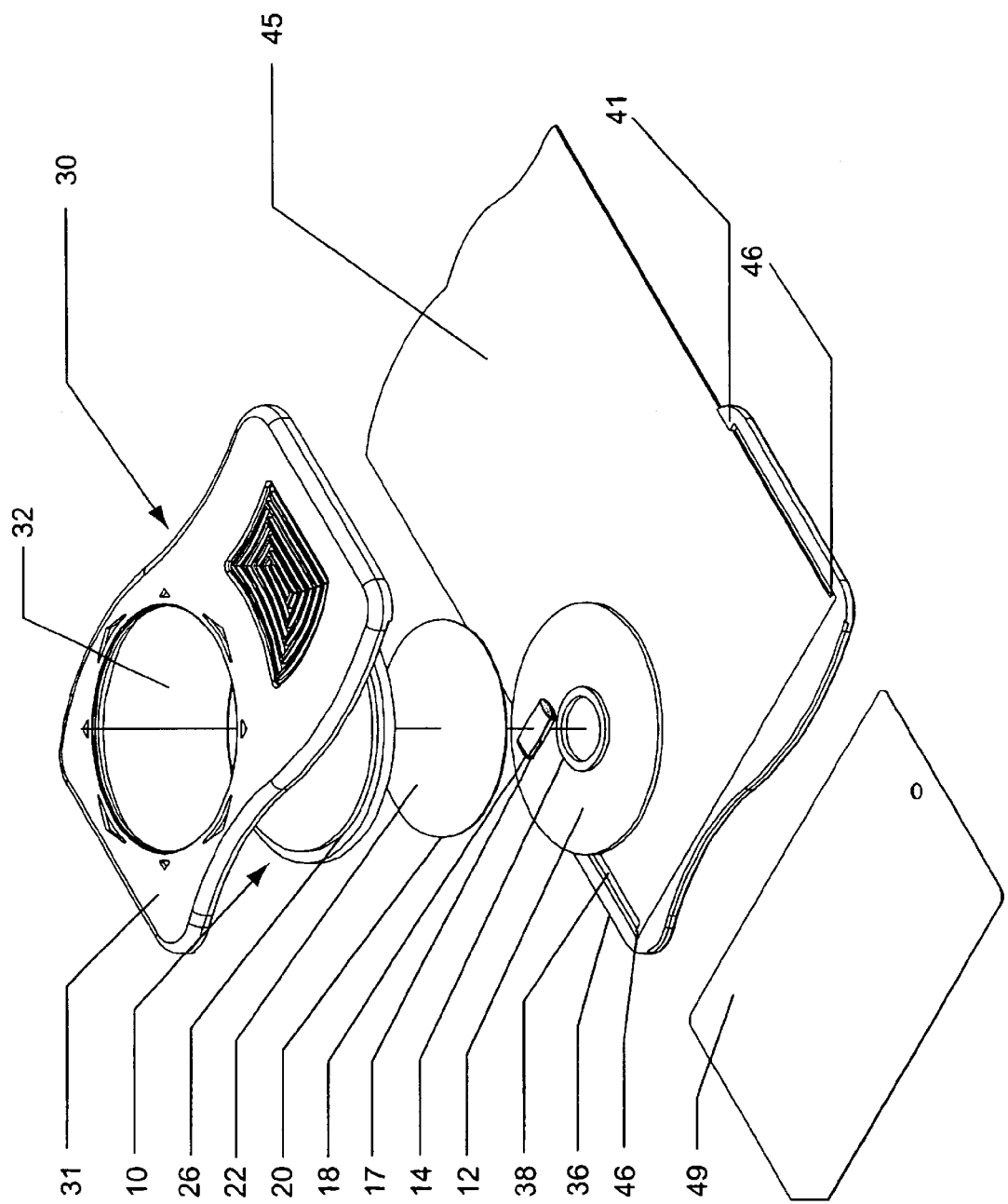
FIG. 1 is an exploded perspective view of a navigation device according to the invention with a first embodiment of a compass module.

Referring to FIG. 1, the navigation device according to the invention includes a compass module 10, a housing 30 in two parts 31, 36, and a map 45. While not part of the device, a transit card 49 may also be stored in the housing, as will be described.

Figure 6:
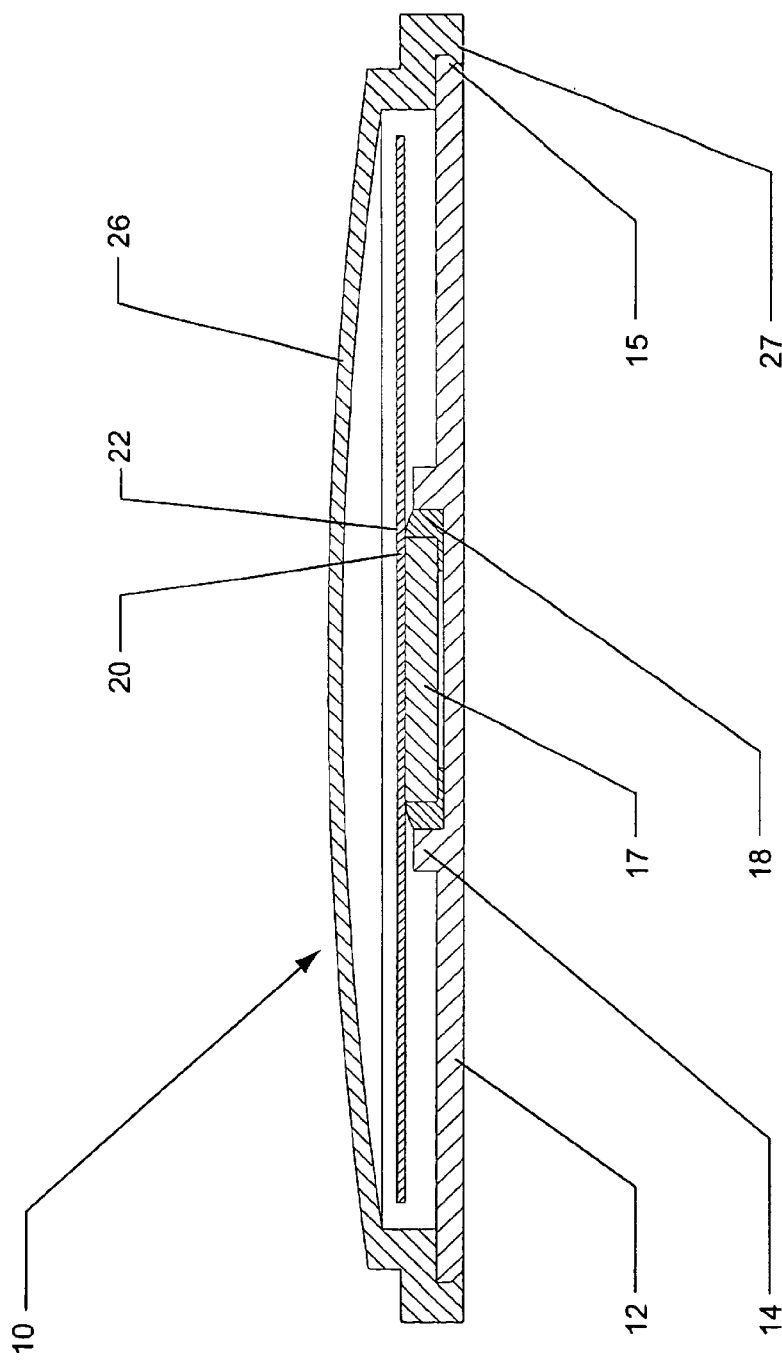
FIG. 6 a section view of the first embodiment of compass module.

Referring also to FIG. 6, a first embodiment of compass module 10 includes a base 12 having a collar 14 which receives an elongate dipolar permanent magnet 17 having ferrofluid beads 18 adhering to polar opposite ends of the magnet by magnetic attraction. The magnet 17 is preferably neodymium, which exerts a magnetic force many times that of a conventional ferrous magnet, thus enabling a very small size, e.g. on the order of one centimeter in length. A disc 20 is adhered to the top of the magnet, the top of the disc having a surface 22 which bears map indicia, as will be described. A transparent cover 26 is fitted to the base 12 in a snap fit, the cover 26 having an inner circumferential lip 27 which snaps over the edge 15 of the base.

Figure 9:
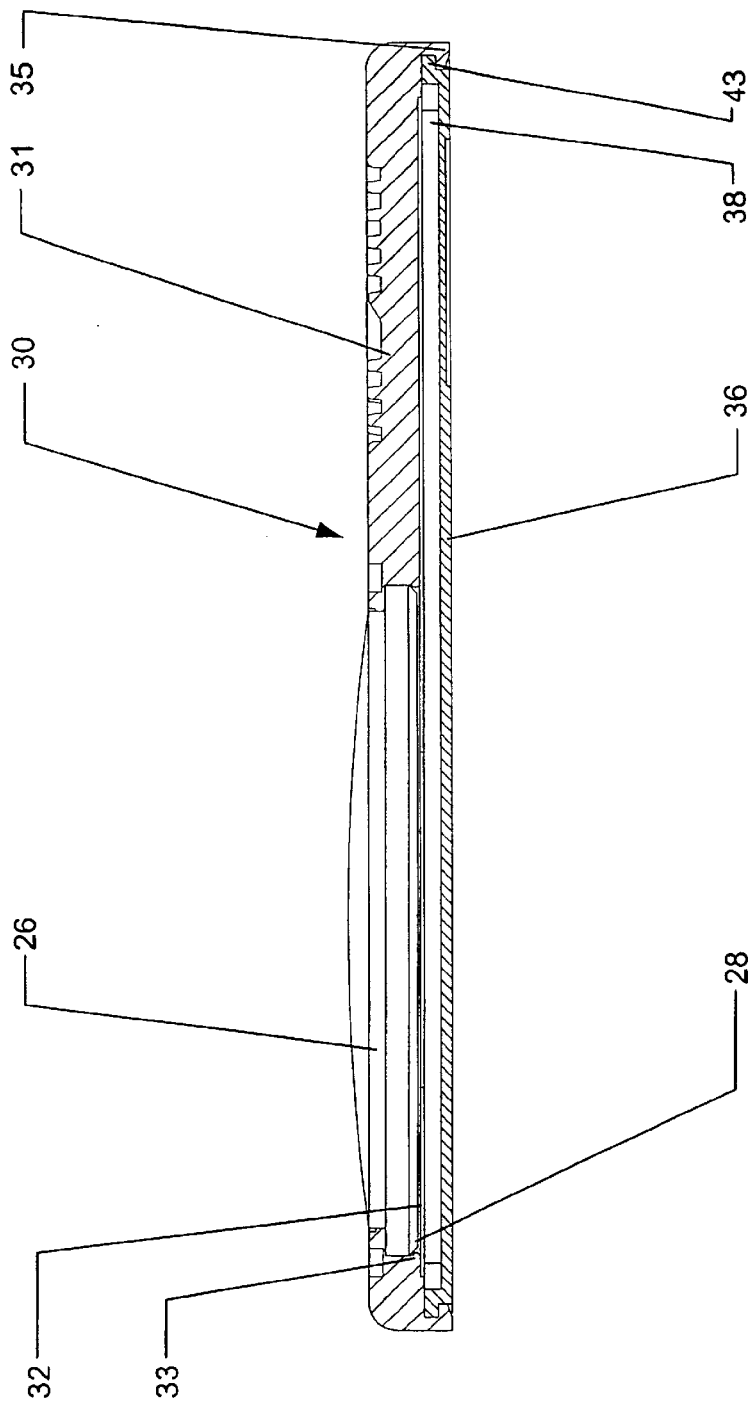
FIG. 9 is a section view of the compass module and housing showing the snap fit of the components.

Referring also to FIG. 9, the top half 31 of the housing 30 has an aperture 32 with an inner lip 33 which receives the outer circumferential lip 28 of the cover 26 in a snap fit. The bottom half 36 of the housing 30 has a recess which forms a compartment 38 when the housings halves 31, 36 are fixed together in a snap fit by means of detents 35 on top half 31 received in recesses 43 in the bottom half 36. The compartment 38 is accessed by a first slot 40 (FIG. 2) which receives a map 45 having opposed tabs 46 which abut shoulders 41 (FIG. 1) to retain the map in the compartment 38. The shoulders 41 are molded adjacent to the slot 40 as part of the bottom half 36.

Figure 2A:
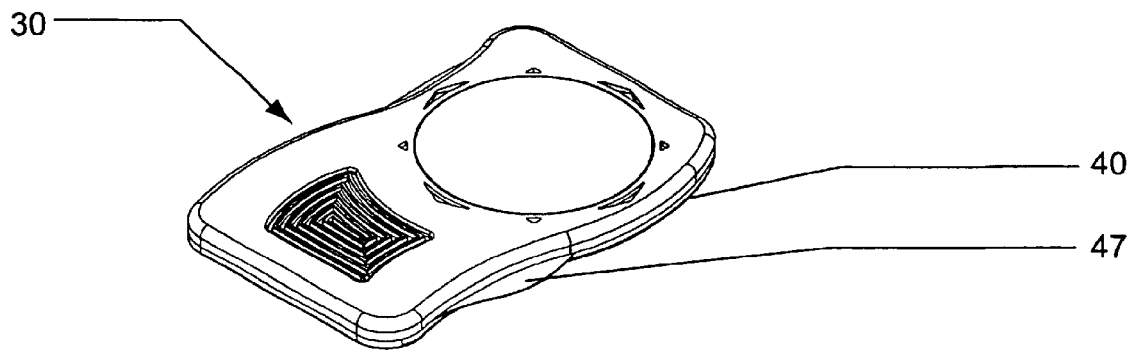
FIG. 2A is a perspective view of the navigation device with the map in its stored position.
Figure 2B:
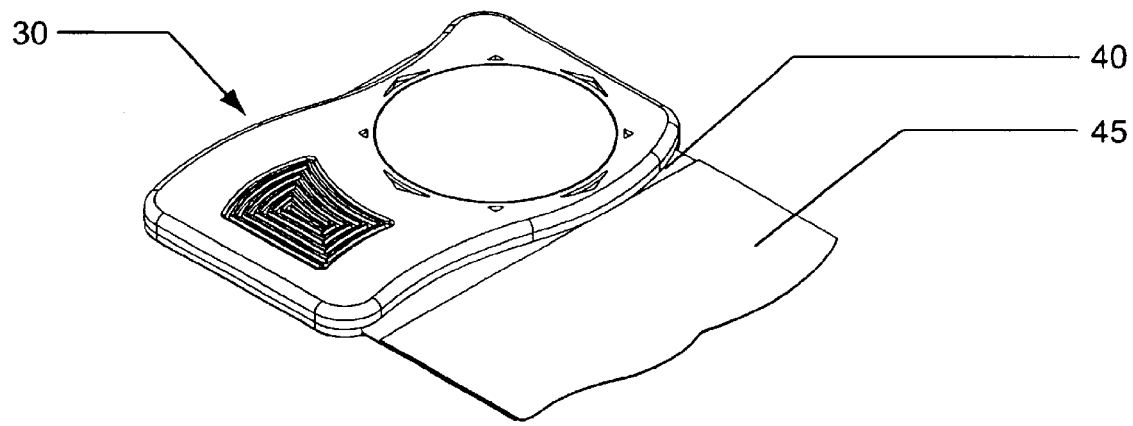
FIG. 2B is a perspective view of the navigation device with the map withdrawn but still folded.
Figure 2C:
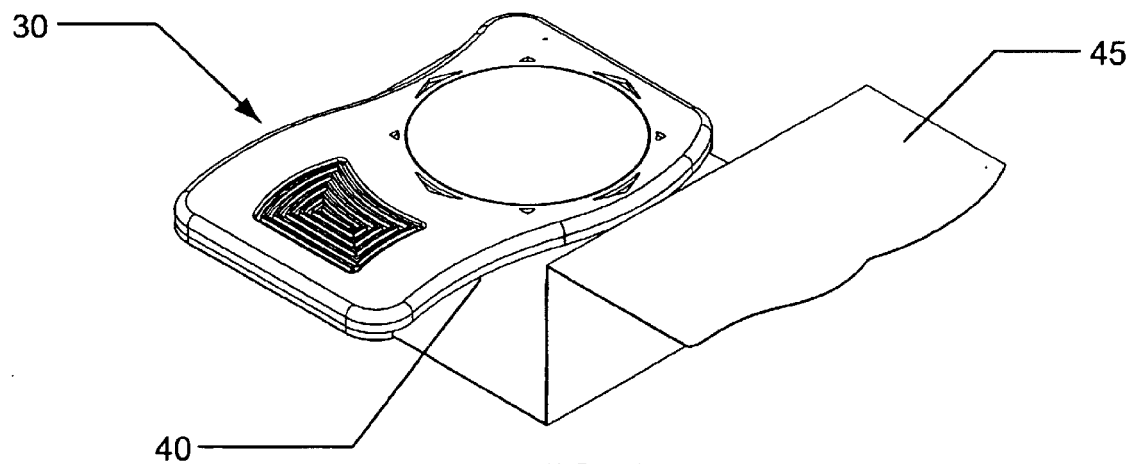
FIG. 2C is a perspective view of the navigation device with the map withdrawn and partially unfolded.

FIGS. 2A, 2B, and 2C show the sequence of withdrawing the map 45 from the slot 40 in housing 30. In FIG. 2A, only the edge portion 47 protrudes. This not only provides means for grasping the map between the finger tips, but also provides means for orienting the compass to the map, as will be discussed in conjunction with FIG. 3. FIG. 2B shows the map 45 withdrawn from the housing in folded condition. FIG. 2C shows the map 45 as it is being unfolded along its two parallel folds.

Figure 3:
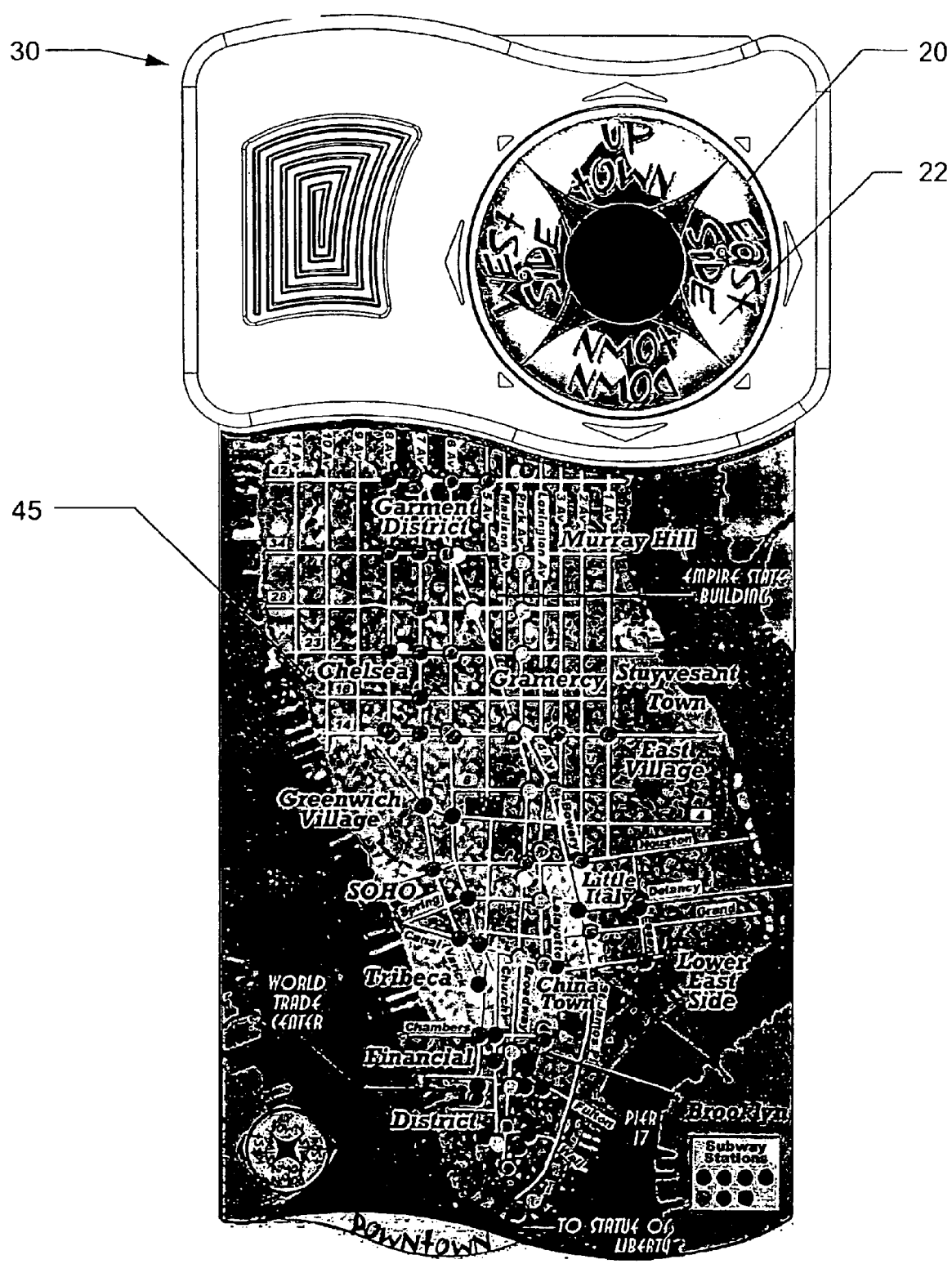
FIG. 3 is a plan view of the device with the map withdrawn and the map indicia on the display surface aligned with the map, wherein the geographic area is Manhattan.

FIG. 3 shows the map 45 in its unfolded, flat state, withdrawn as far as possible from the housing 30 and being retained by the tabs 46 and shoulders 41 (FIG. 1). The map represents a predetermined geographic area, which in the example shown is the southern half of Manhattan. Map features include sections of the city and subway stops, which in the commercial embodiment are color coded to be the same as the MTA color codes for New York City. The other side of the map shows the northern half of Manhattan. The top surface 22 of the disc 20 is a display surface having map indicia for the same pre-determined geographic area. In the example shown, the map indicia on the surface 22 are uptown, downtown, the east side, and the west side. The map indicia on the display surface are shown aligned with similar features on the map; this alignment is achieved by holding the housing 30 level and rotating the housing and the map as a unit. The disc maintains a constant orientation with respect to magnetic north by virtue of the magnet fixed to the bottom of the disc, which is freely rotatable in the compass module. The disc 20 is therefore analogous to the needle of an ordinary compass, while the map 45 is analogous to the face of an ordinary compass.

Note well that the map indicia for Manhattan do not coincide with true magnetic north, south, east and west, because the avenues extend from the southwest to the northeast at about 30 degrees from true magnetic north. It is not necessary for the user to know his true geographic orientation, as he is usually only concerned with his orientation on the map. Nevertheless, indicia may be provided on the housing and the disc to indicate when the magnet is aligned with magnetic north. This would give the navigation device some utility outside of the predetermined geographic area.

Figure 4:
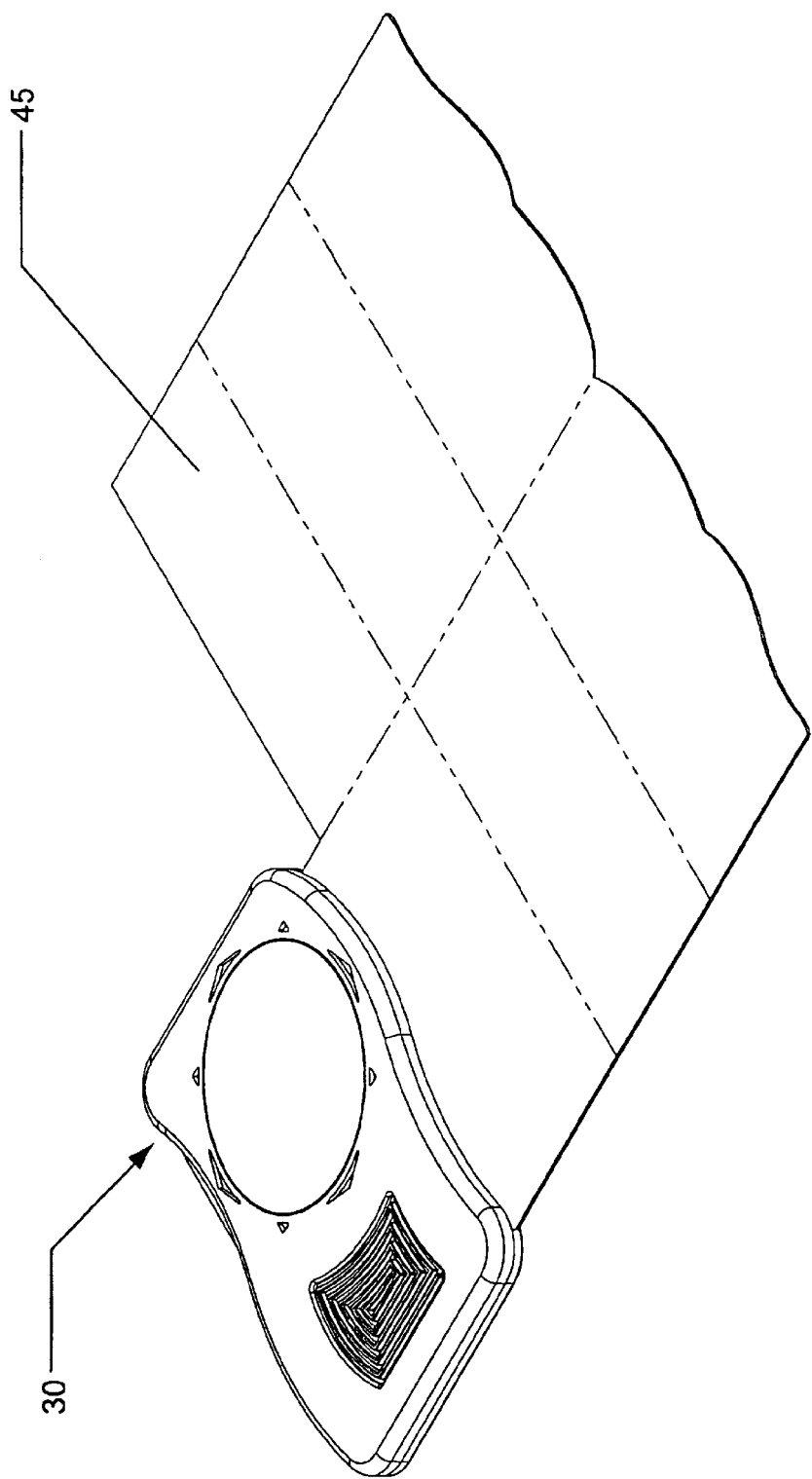
FIG. 4 is a perspective view of the device with an alternative map shape, with fold lines shown in phantom.

FIG. 4 shows a map 45 for a predetermined geographic area having a different shape, for example Washington D.C., in which case the map indicia on the display surface could be the Potomac River and Capitol tourist attractions such as the White House, the Smithsonian, the Lincoln Memorial, etc. With the navigation device of the present invention, an urban tourist emerging from a subway station can easily orient himself toward his destination without regard for his actual bearing. However the pre-determined geographic area need not be a city, and it can cover a larger area, such as a National Park. For example, the pre-determined geographic area could be Yellowstone National Park. In this case the map indicia on the display surface could be the park roads or geographic features such as Old Faithful and the Yellowstone River.

Note that the difference between magnetic north and geographic north is usually insignificant, particularly at latitudes and longitudes in the United States, except Alaska (recall that the magnetic north pole is in the Canadian arctic). However, in Alaska and European cities, this difference is more significant and can lead to discrepancies when using a compass with a map indicating geographic north. By designing the device for magnetic north in the predetermined area, this discrepancy is eliminated.

Figure 5:
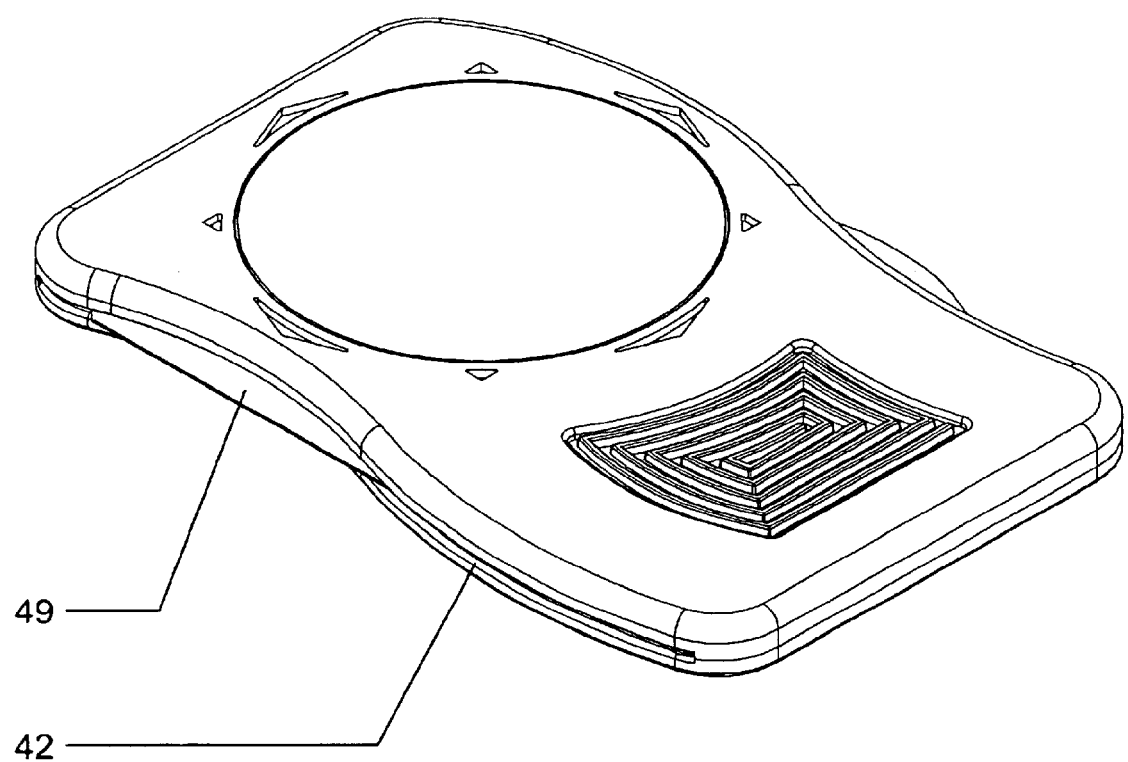
FIG. 5 is a perspective view of the navigation device with a transit card in its stored position.

FIG. 5 is a perspective showing a second slot 42 which faces oppositely from the first slot 40 (FIG. 2A) and receives a transit card 49 for use in card readers at substations or on buses. The urban navigator therefore has a map, a compass, and a fare card in one convenient package which can easily fit in a shirt pocket, and further provides a souvenir of the geographic area visited.

Figure 7:
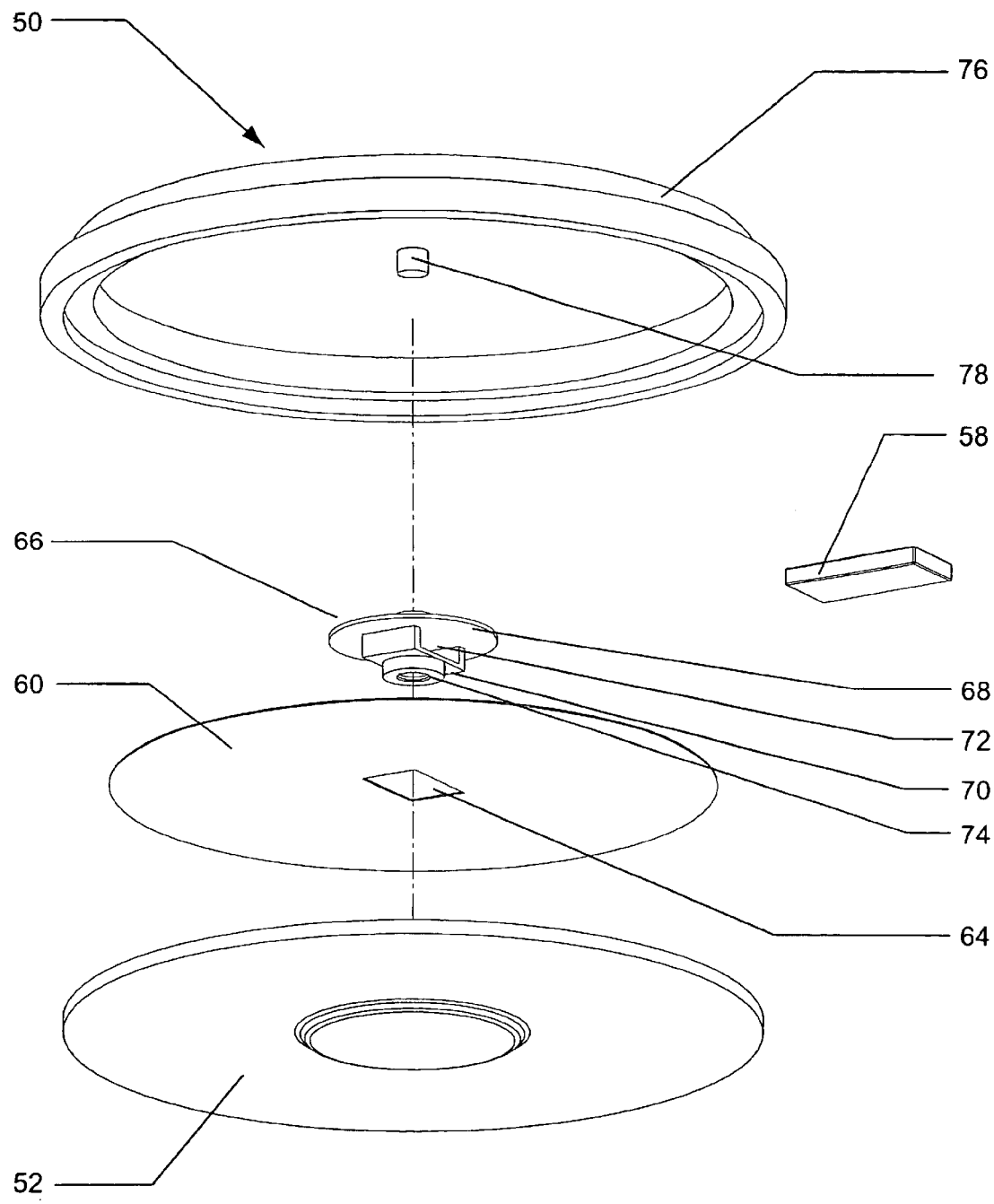
FIG. 7 is an exploded bottom perspective view of a second embodiment of compass module.
Figure 8:
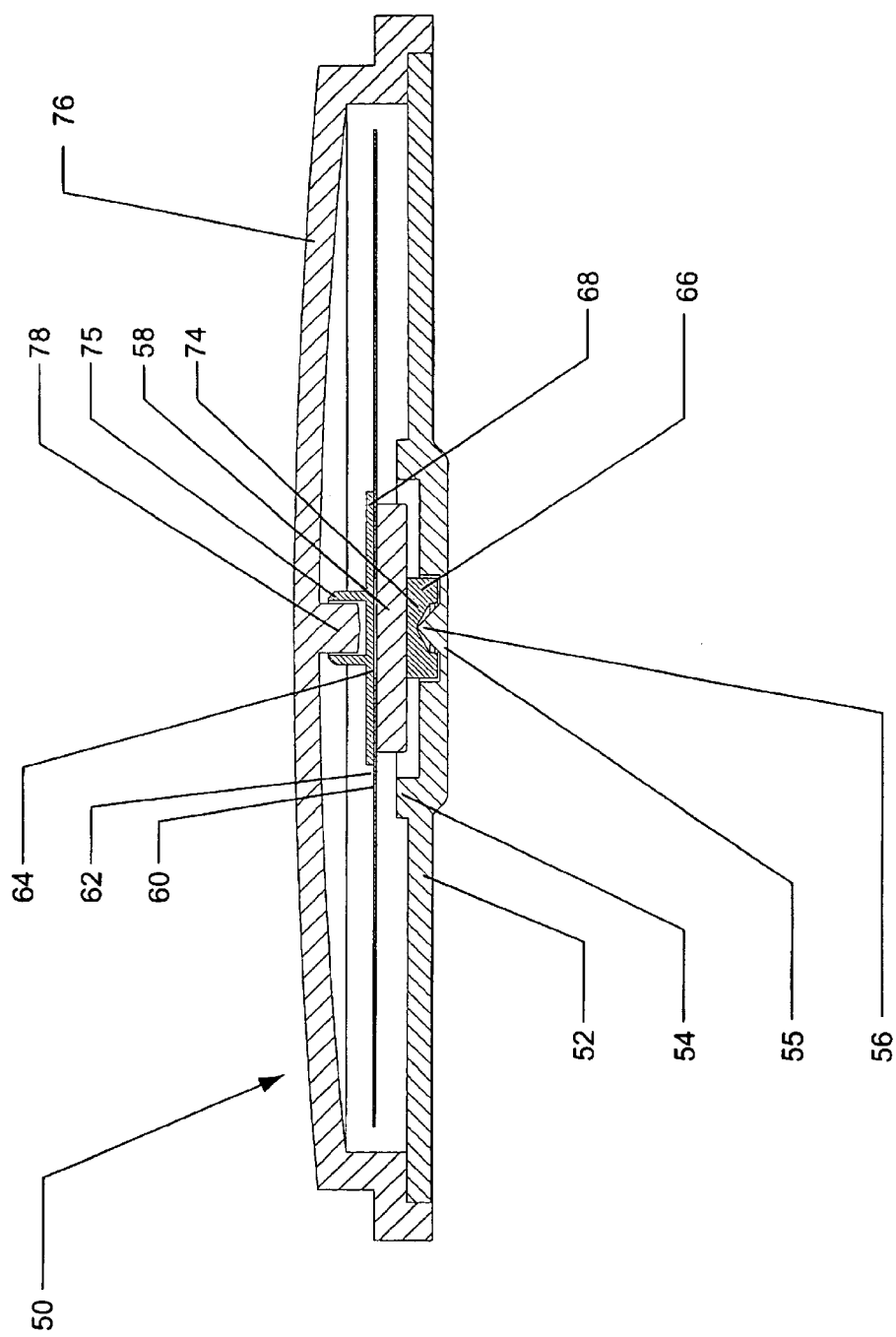
FIG. 8 is a section view of the second embodiment of compass module as assembled.

FIGS. 7 and 8 show a second embodiment of the compass module 50, which includes a base 52 having a collar 54 surrounding a central cone 55 having an apex 56 which provides a pivot point about which disc 60 can rotate. The disc 60 has a display surface 62 for the map indicia and a rectangular central aperture 64 for fixing a carrier 66. The carrier 66 has a flange 68 received against the display surface 62, and a bracket 70 received through the aperture 62. The bracket 70 has an aperture 72 which receives the magnet 58 in a press fit to fix the magnet 58 and the carrier 66 with respect to the disc 60. The bottom of the bracket 70 has a conical recess 74 which is self-centering on the cone 55, and the carrier 66 has an upstanding sleeve 75 which receives a cylindrical pin 78 molded on transparent cover 76 and serving as a journal. When the base is held horizontally, the disc 60 can therefore rotate freely in the compass module 50 without wobbling, so that the magnet will orient itself to the earth's magnetic north. The user can then orient himself in the geographic area represented by the map indicia on the display surface 62, and can use the map to locate additional features. The second embodiment of compass module 50 is assembled using the same snap-fit features as the first embodiment of module 10, and has the same external features for snap fit into the housing 30.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A navigation device comprising:
    a base;
    a permanent dipolar magnet mounted for rotation relative to said base so that said magnet tends to align with earth's magnetic north; and
    a display surface fixed with respect to said magnet, said display surface having map indicia for a predetermined geographic area, said map indicia being oriented to define a direction of magnetic north with respect to said map indicia, said map indicia being aligned with respect to said magnet so that the direction of magnetic north with respect to said map indicia coincides with earth's magnetic north when said magnet is aligned with earth's magnetic north.

2. A navigation device as in claim 1 further comprising:
    a disc which is fixed with respect to said magnet, said display surface being provided on said disk; and
    a transparent cover fixed to said base and arranged over said disc so that said display surface is visible through said cover.

3. A navigation device as in claim 2 further comprising a carrier which is mounted for rotation with respect to said base, said disk and said magnet being fixed with respect to said carrier.

4. A navigation device as in claim 3 wherein one of said carrier and said base comprises a protrusion having an apex which defines a pivot point, and the other of said carrier and said base comprises a recess which is self-centering on said pivot point, said carrier being rotatable about said pivot point.

5. A navigation device as in claim 4 wherein one of said cover and said carrier comprises a pin, the other of said cover and said carrier comprising a cylindrical bearing which receives said pin to permit rotation of said carrier with respect to said pin and to prevent wobbling of said carrier with respect to said base.

6. A navigation device as in claim 3 wherein said carrier comprises a flange and a bracket, said disk having an aperture which receives said bracket therethrough so that said flange is against said surface having said indicia, said bracket having an aperture which receives said magnet therethrough to fix said bracket to said disc.

7. A navigation device as in claim 6 wherein said base comprises a cone having an apex which defines a pivot point, and said bracket comprises a conical depression which is self-centering on said pivot point, said carrier being rotatable about said pivot point.

8. A navigation device as in claim 6 wherein said carrier comprises a pin extending above said flange, said cover having a cylindrical bearing which receives said pin to permit rotation of said carrier with respect to said pin and to prevent wobbling of said carrier with respect to said base.

9. A navigation device as in claim 2 further comprising two beads of ferrofluid adhering to respective poles of said magnet and supporting said magnet against said base so that said magnet can rotate about a point between said beads.

10. A navigation device as in claim 9 wherein said base comprises a collar which receives said magnet and said beads therein.

11. A navigation device as in claim 1 wherein said map indicia comprise areas of a city.

12. A navigation device as in claim 1 further comprising a map of said predetermined geographic area attached to said base.

13. A navigation device as in claim 12 further comprising a housing attached to said base, said housing having a compartment and a first slot for accessing said compartment, said map being slideably received in said compartment via said first slot.

14. A navigation device as in claim 13 wherein said map is folded for reception in said compartment.

15. A navigation device as in claim 14 wherein said map comprises a portion which protrudes from said slot when said map is folded and received in said compartment, said portion having map indicia which align with corresponding map indicia on said surface when said magnet is aligned with earth's magnetic north.

16. A navigation device as in claim 13 wherein said compartment has a pair of inward facing shoulders adjacent to said first slot, and said map has a pair of opposed tabs which bear against said shoulders to prevent completely removing said map from said compartment.

17. A navigation device as in claim 13 wherein said housing has a second slot for accessing said compartment, said second slot facing oppositely from said first slot and being profiled to receive a mass transit card.

18. A navigation device as in claim 2 wherein said base, said permanent dipolar magnet, said display surface, and said transparent cover form a compass module, said device further comprising a housing having a compartment and at least one slot for receiving at least one of a folded map and a mass transit card, said compass module being fixed to said housing.

19. A navigation device as in claim 18 wherein said housing comprises a top half and a bottom half which are fixed together to form said compartment therebetween, said top half having an aperture which receives said compass module so that said transparent cover spans said aperture.

20. A navigation device as in claim 19 wherein said compass module is fixed to said top half of said housing in a snap fit.

21. A navigation device as in claim 19 wherein said top half and said bottom half are fixed together in a snap fit.

22. A navigation device as in claim 2 wherein said base and said transparent cover are assembled together in a snap fit.

* * * * *